United States Patent
Horiuchi et al.

(10) Patent No.: US 10,951,074 B2
(45) Date of Patent: Mar. 16, 2021

(54) PERMANENT MAGNET, ROTARY ELECTRICAL MACHINE, AND VEHICLE

(71) Applicant: KABUSHIKI KAISHA TOSHIBA, Tokyo (JP)

(72) Inventors: Yosuke Horiuchi, Ota Tokyo (JP); Shinya Sakurada, Shinagawa Tokyo (JP); Masaya Hagiwara, Yokohama Kanagawa (JP); Tadahiko Kobayashi, Yokohama Kanagawa (JP); Toshihide Takahashi, Yokohama Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 308 days.

(21) Appl. No.: 15/437,474

(22) Filed: Feb. 21, 2017

(65) Prior Publication Data
US 2017/0271929 A1   Sep. 21, 2017

(51) Int. Cl.
*H01F 1/055* (2006.01)
*B22F 9/04* (2006.01)
(Continued)

(52) U.S. Cl.
CPC ............. *H02K 1/02* (2013.01); *B22D 7/00* (2013.01); *B22D 25/06* (2013.01); *B22F 3/16* (2013.01);
(Continued)

(58) Field of Classification Search
None
See application file for complete search history.

(56) References Cited

U.S. PATENT DOCUMENTS

| 2009/0261774 A1 | 10/2009 | Yuuki et al. |
| 2012/0181970 A1 | 7/2012 | Yuuki et al. |

(Continued)

FOREIGN PATENT DOCUMENTS

| CN | 105264621 | 1/2016 |
| JP | 52-096923 | 8/1977 |

(Continued)

OTHER PUBLICATIONS

Liu et al. (IEEE Transactions on Magnetics, 1989, vol. 25, No. 5, p. 3785-3787). (Year: 1989).*

(Continued)

*Primary Examiner* — Xiaowei Su
(74) *Attorney, Agent, or Firm* — Amin, Turocy & Watson, LLP

(57) ABSTRACT

A permanent magnet is expressed by a composition formula: $R_pFe_qM_rCu_tCo_{100-p-q-r-t}$. The magnet comprises a metal structure including a main phase having a $Th_2Zn_{17}$ crystal phase and a grain boundary phase. The main phase includes a cell phase having the $Th_2Zn_{17}$ crystal phase and a Cu-rich phase. A section including a c-axis of the $Th_2Zn_{17}$ crystal phase has a first region in the crystal grain and a second region in the crystal grain, the first region is provided in the cell phase divided by the Cu-rich phase, the second region is provided within a range of not less than 50 nm nor more than 200 nm from the grain boundary phase in a direction perpendicular to an extension direction of the grain boundary phase, and a difference between a Cu concentration of the first region and a Cu concentration of the second region is 0.5 atomic percent or less.

12 Claims, 6 Drawing Sheets

(51) Int. Cl.
*B22F 3/16* (2006.01)
*B22F 3/24* (2006.01)
*H02K 1/02* (2006.01)
*C22C 19/07* (2006.01)
*C22C 1/02* (2006.01)
*B22D 7/00* (2006.01)
*B22D 25/06* (2006.01)
*C22C 30/02* (2006.01)
*C22F 1/10* (2006.01)
*H02K 1/27* (2006.01)
*H02K 7/00* (2006.01)
*H02K 7/18* (2006.01)
*H01F 1/059* (2006.01)

(52) U.S. Cl.
CPC .......... *B22F 3/24* (2013.01); *B22F 9/04* (2013.01); *C22C 1/02* (2013.01); *C22C 19/07* (2013.01); *C22C 30/02* (2013.01); *C22F 1/10* (2013.01); *H01F 1/055* (2013.01); *H01F 1/0557* (2013.01); *H02K 1/276* (2013.01); *H02K 7/003* (2013.01); *H02K 7/1823* (2013.01); *B22F 2003/248* (2013.01); *B22F 2009/044* (2013.01); *B22F 2202/05* (2013.01); *B22F 2301/15* (2013.01); *B22F 2998/10* (2013.01); *B22F 2999/00* (2013.01); *H01F 1/0596* (2013.01)

(56) References Cited

U.S. PATENT DOCUMENTS

| | | |
|---|---|---|
| 2012/0242180 A1 | 9/2012 | Horiuchi et al. |
| 2013/0082559 A1 | 4/2013 | Hagiwara et al. |
| 2013/0241682 A1* | 9/2013 | Horiuchi ............... H01F 1/0557 335/302 |
| 2015/0143952 A1 | 5/2015 | Horiuchi et al. |
| 2015/0194246 A1 | 7/2015 | Horiuchi et al. |
| 2015/0228385 A1 | 8/2015 | Horiuchi et al. |
| 2015/0270039 A1 | 9/2015 | Horiuchi et al. |
| 2016/0086702 A1 | 3/2016 | Horiuchi et al. |

FOREIGN PATENT DOCUMENTS

| | | |
|---|---|---|
| JP | 5-171323 | 7/1993 |
| JP | 6-212327 | 8/1994 |
| JP | 9-111383 | 4/1997 |
| JP | 2904667 | 3/1999 |
| JP | 2008-029148 | 2/2008 |
| JP | 2008-043172 | 2/2008 |
| JP | 2012-204599 | 10/2012 |
| JP | 2013-074235 | 4/2013 |
| JP | 2013-138258 | 7/2013 |
| JP | 2013-191815 | 9/2013 |
| JP | 2014-156656 | 8/2014 |
| JP | 2014-192193 | 10/2014 |
| WO | 2015/037041 A1 | 3/2015 |
| WO | 2015/044974 A1 | 4/2015 |
| WO | 2015/140832 A1 | 9/2015 |
| WO | 2016/042591 A1 | 3/2016 |

OTHER PUBLICATIONS

Extended European Search Report for European Patent Application No. 17156851.2 dated Sep. 29, 2017.

Yonamine, et al. "Electron back scattered diffraction characterization of Sm (CoFeCuZr)z magnets", Journal of Applied Physics 109, 07A750, 2011.

C. Maury, et al. "Genesis of the Cell Microstructure in the Sm (Co, Fe, Cu, Zr) Permanent Magnets with 2:17 Type", Phys. Stat. Sol. (a) 140, 57, 1993.

* cited by examiner

PERMANENT MAGNET, ROTARY ELECTRICAL MACHINE, AND VEHICLE

CROSS-REFERENCE TO RELATED APPLICATIONS

This application is based upon and claims the benefit of priority from International Patent Application No. PCT/JP2016/001537, filed on Mar. 17, 2016; the entire contents of which are incorporated herein by reference.

FIELD

Embodiments described herein generally relate to a permanent magnet, a rotary electrical machine, and a vehicle.

BACKGROUND

Known examples of a high-performance rare earth magnet include Sm—Co based magnets, Nd—Fe—B based magnets, and the like. Fe and Co in the magnets contribute to an increase of saturation magnetization. These magnets contain rare earth elements such as Nd and Sm, which bring about large magnetic anisotropy derived from the behavior of a 4f electron in the rare earth elements in a crystal field. This creates large coercive force, thereby realizing a high-performance magnet.

The high-performance magnets are mainly used for electric devices such as a motor, a speaker, and a measuring instrument. In recent years, requests for downsizing, weight reduction, and low power consumption of various electric devices have been increased. In response to the requests, there is a demand for a permanent magnet with higher performance that has an improved maximum magnetic energy product (BHmax) of the permanent magnet. In recent years, a variable magnetic flux motor has been proposed, and contributes to an improvement in efficiency of a motor.

The Sm—Co-based magnet is high in Curie temperature and can achieve good motor property at high temperature. However, the Sm—Co-based magnet is desired to have a higher coercive force, higher magnetization, and an improved squareness ratio. It is considered that increasing the concentration of Fe is effective for higher magnetization of the Sm—Co-based magnet. However, with the conventional manufacturing method, increasing the concentration of Fe tends to deteriorate the squareness ratio. Thus, the realization of a high-performance magnet for motor requires a technique that achieves expression of a good squareness ratio while improving the magnetization with a high Fe concentration composition.

DETAILED DESCRIPTION

Figure 1:
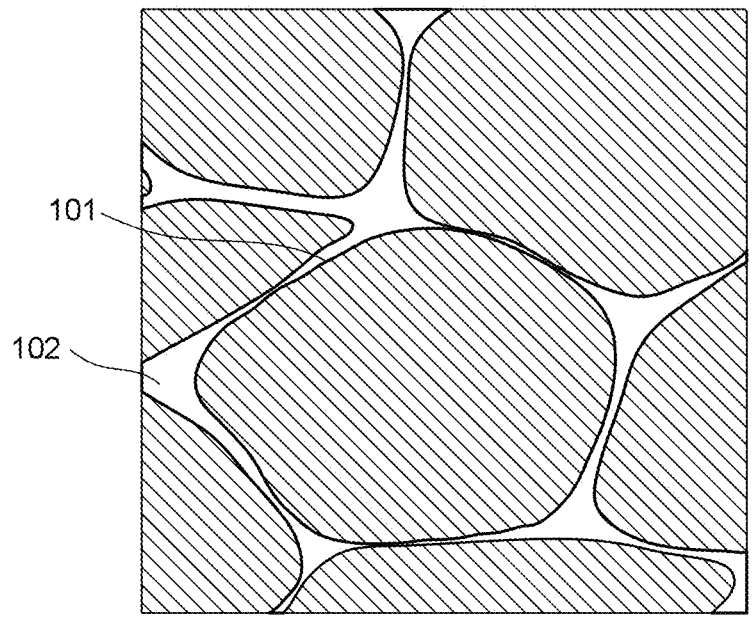
FIG. 1 is a section schematic view illustrating a configuration example of a permanent magnet.

A permanent magnet expressed by a composition formula: $R_pFe_qM_rCu_tCo_{100-p-q-r-t}$. R represents at least one element selected from the group consisting of rare earth elements, M represents at least one element selected from the group consisting of Zr, Ti, and Hf, p represents a number satisfying $10.5 \leq p \leq 12.4$ atomic percent, q represents a number satisfying $26 \leq q \leq 40$ atomic percent, r represents a number satisfying $0.88 \leq r \leq 4.3$ atomic percent, and t represents a number satisfying $3.5 \leq t \leq 13.5$ atomic percent. The magnet comprises: a metal structure including a main phase having a $Th_2Zn_{17}$ crystal phase and a grain boundary phase provided between crystal grains of the main phase. The main phase includes a cell phase having the $Th_2Zn_{17}$ crystal phase and a Cu-rich phase, the Cu-rich phase is provided to divide the cell phase and has a Cu concentration higher than the cell phase. A section including a c-axis of the $Th_2Zn_{17}$ crystal phase has a first region in the crystal grain and a second region in the crystal grain, the first region is provided in the cell phase divided by the Cu-rich phase, the second region is provided within a range of not less than 50 nm nor more than 200 nm from the grain boundary phase in a direction perpendicular to an extension direction of the grain boundary phase, and a difference between a Cu concentration of the first region and a Cu concentration of the second region is 0.5 atomic percent or less.

Hereinafter, embodiments will be described with reference to the drawings. The drawings are schematic and a relation between a thickness and a plane dimension, a ratio of thicknesses of respective layers, and so on for example may be different from actual ones. Further, in the embodiments, the same reference numerals are given to practically the same components, and explanation will be omitted.

First Embodiment

A permanent magnet of this embodiment will be described hereinafter.

<Configuration Example of Permanent Magnet>

The permanent magnet of this embodiment has a composition expressed by a composition formula: $R_pFe_qM_rCu_tCo_{100-p-q-r-t}$ (where R represents at least one element selected from rare earth elements, M represents at least one element selected from the group consisting of Zr, Ti and Hf, p represents a number satisfying $10.5 \leq p \leq 12.4$ atomic percent, q represents a number satisfying $26 \leq q \leq 40$ atomic percent, r represents a number satisfying $0.88 \leq r \leq 4.3$ atomic percent, and t represents a number satisfying $3.5 \leq t \leq 13.5$ atomic percent.

R in the composition formula is an element capable of bringing about large magnetic anisotropy to a magnetic material. As the element R, at least one element selected from rare earth elements can be cited. There can be cited, for example, yttrium (Y), samarium (S), cerium (Ce), praseodymium (Pr), neodymium (Nd), or the like. A single kind of element R may be used or a plurality of kinds of elements R may be used. It is preferable to use Sm in particular. For example, in the case where the plurality of elements including Sm are used as the element R, setting an Sm concentration to 50 atomic percent or more of the entire elements applicable as the element R can increase a performance of the magnetic material, for example, coercive force. It is further preferable that 70 atomic percent or more, further, 90 atomic percent or more, of the elements applicable as the R element is set to Sm.

When p in the composition formula is less than 10.5 atomic percent, a large amount of α-Fe precipitates and the coercive force becomes small, and when p in the composition formula exceeds 12.4 atomic percent, saturation magnetization decreases. In the composition formula, p is more preferably 10.9 atomic percent or more and 12.1 atomic percent or less, and further, 11.0 atomic percent or more and 12.0 atomic percent or less.

In the composition formula, M is an element enabling exertion of large coercive force in a composition with a high Fe concentration. As the element M, for example, one element or a plurality of elements selected from the group consisting of titanium (Ti), zirconium (Zr), and hafnium (Hf) is (are) used. A single kind of element M can be used or a plurality of kinds of elements M may be used. When r in the composition formula exceeds 4.3 atomic percent, a heterophase which contains the element M excessively is likely to occur and both coercive force and magnetization become likely to decrease. When r (content of element M) in the above-mentioned composition formula is less than 0.88 atomic percent, an effect to increase the Fe concentration is likely to be small. The content of the element M is more preferably 1.14 atomic percent or more and 3.58 atomic percent or less, and further, 1.49 atomic percent or more and 2.24 atomic percent or less, and still further, 1.55 atomic percent or more and 2.23 atomic percent or less.

The element M is preferable to include at least Zr. Especially, setting 50 atomic percent or more of the element M to Zr can increase the coercive force of the permanent magnet. Meanwhile, Hf is expensive among the element M, and even when Hf is used, the amount to be used is preferably small. For example, a concentration of Hf is preferably less than 20 atomic percent of the element M.

Cu is an element enabling the magnetic material to exert high coercive force. When t (content of Cu) in the composition formula exceeds 13.5 atomic percent, magnetization is likely to decrease. When t in the composition formula is less than 3.5 atomic percent, it is difficult to obtain high coercive force and a good squareness ratio. The content of Cu is more preferably 3.9 atomic percent or more and 9.0 atomic percent or less, and further, 4.3 atomic percent or more and 5.8 atomic percent or less.

Fe is an element responsible mainly for magnetization of the magnetic material. Compounding a large amount of Fe can increase saturation magnetization of the magnetic material, but excessive compounding makes it hard to obtain a desired crystal phase due to precipitation of α-Fe or phase separation, resulting in that coercive force may be decreased. Thus, a content q is preferably 26 atomic percent or more and 40 atomic percent or less. The content q of Fe is more preferably 29 atomic percent or more and 36 atomic percent or less, and further, 30 atomic percent or more and 33 atomic percent or less.

Co is an element responsible for magnetization of the magnetic material and enabling the magnetic material to exert high coercive force. Further, compounding much Co makes it possible to obtain a high Curie temperature and to increase heat stability of the magnetic property. When a compounding amount of Co is small, effects as above become small. However, excessive addition of Co relatively decreases a proportion of Fe, resulting in that magnetization may decrease. Further, as a result of replacing 20 atomic percent or less of Co with one element or a plurality of elements selected from the group consisting of Ni, V, Cr, Mn, Al, Si, Ga, Nb, Ta, and W, the magnetic property, for example, the coercive force, can be increased. For such replacement elements, a single kind of element can be used or a plurality of kinds of elements may be used.

FIG. 1 is a section schematic view illustrating a configuration example of a permanent magnet of this embodiment. FIG. 1 illustrates a part of a cross section of the permanent magnet. The permanent magnet of the this embodiment has a two-dimensional metal structure which includes a crystal grain 101 having a hexagonal system $Th_2Zn_{17}$ crystal phase (2-17 crystal phase) and a grain boundary phase 102 provided between the crystal grains 101. The crystal grain 101 constitutes a main phase (phase whose volume occupancy ratio is the highest among respective crystal grain phases and amorphous phases in the permanent magnet) of the permanent magnet.

Figure 2:
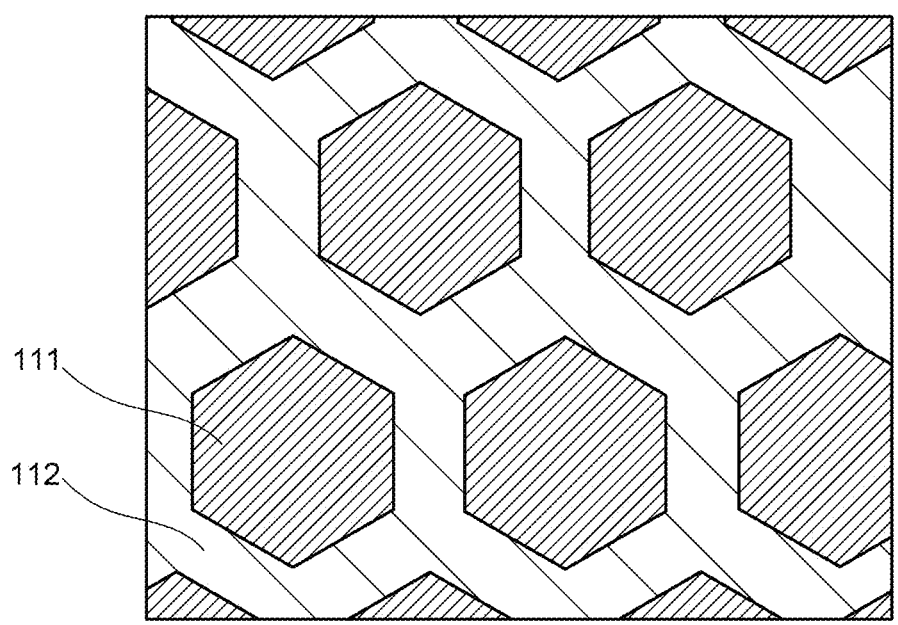
FIG. 2 is a section schematic view illustrating a configuration example of a metal structure.

FIG. 2 is a section schematic view illustrating a configuration example of the metal structure. FIG. 2 illustrates a part of a cross section including a c-axis of a $Th_2Zn_{17}$ crystal phase. The metal structure illustrated in FIG. 2 includes a cell phase 111 having the 2-17 crystal phase and a Cu-rich phase 112 having a hexagonal system $CaCu_5$ crystal phase (1-5 crystal phase). The Cu-rich phase 112 is preferable to be formed to surround the cell phase. The structure is also referred to as a cell structure. The Cu-rich phase 112 includes a cell wall phase dividing the cell phase. The c-axis of the $Th_2Zn_{17}$ crystal phase is preferably provided in parallel to or almost in parallel to an easy magnetization axis. Note that almost in parallel means in a direction within a range of −10 degrees or more and 10 degrees or less from a parallel direction, for example.

The Cu-rich phase 112 is a phase which contains Cu of concentration higher than that of the $Th_2Zn_{17}$ crystal phase. The Cu concentration of the Cu-rich phase is preferably 1.2 times or more the Cu concentration of the $Th_2Zn_{17}$ crystal phase, for example. The Cu concentration of the $Th_2Zn_{17}$ crystal phase is preferably 3.5 atomic percent or more and 13.5 atomic percent or less, for example. The Cu-rich phase 112 exists linearly or in a plate state in a cross section which includes a c-axis in the $Th_2Zn_{17}$ crystal phase, for example A structure of the Cu-rich phase 112 is not limited in particular, but a hexagonal system $CaCu_5$ crystal phase (1-5 crystal phase), or the like, for example, can be cited. Further, the permanent magnet may have a plurality of Cu-rich phases with different phases.

Magnetic domain wall energy of the Cu-rich phase 112 is higher than magnetic domain wall energy of the $Th_2Zn_{17}$ crystal phase, and a difference in magnetic domain wall energy becomes a barrier to magnetic domain wall displacement. That is, as a result that the Cu-rich phase 112 functions as a pinning site, magnetic domain wall displacement among a plurality of cells can be suppressed. Forming a cell structure, in particular, increases an effect to suppress magnetic domain wall displacement. This is also referred to as a magnetic domain wall pinning effect. Therefore, it is more preferable that the Cu-rich phase 112 is formed in a manner to surround the cell phase 111.

In the Sm—Co based magnet containing Fe of 26 atomic percent or more, a Cu concentration of the Cu-rich phase 112 is preferably 10 atomic percent or more and 60 atomic percent or less. Increasing the Cu concentration of the Cu-rich phase 112 enables an increase in coercive force and squareness ratio. In a region where an Fe concentration is high, variation in Cu concentration of the Cu-rich phase 112 is likely to occur, and, for example, a Cu-rich phase having a large magnetic domain wall pinning effect and a Cu-rich phase having a small magnetic domain wall pinning effect occur, so that the coercive force and the squareness ratio decrease. The Cu concentration of the Cu-rich phase 112 is more preferably 30 atomic percent or more and 60 atomic percent or more, and further, 40 atomic percent or more and 60 atomic percent or less.

When a magnetic domain wall out of a pinning site is displaced, magnetization reverses by a quantity of displacement, so that magnetization decreases. In applying an external magnetic field, if the magnetic domain walls come out of the pinning site at once in a certain magnetic field, magnetization becomes hard to decrease by application of the magnetic field, so that a good squareness ratio can be obtained. In other words, it is conceived that in application of the magnetic field if the magnetic domain wall comes out of the pinning site in a magnetic field lower than the coercive force and the magnetic domain wall is displaced, the magnetization decreases by the quantity of displacement, leading to deterioration of the squareness ratio.

The crystal grain and the grain boundary phase forming the main phase can be defined by a measurement result of SEM-electron backscattering pattern (SEM-EBSP) using SEM. A procedure will be shown below. First, as a preprocessing, a specimen is embedded by an epoxy resin, mechanically-polished and buff-finished, followed by water washing and water spraying by air blow. The specimen after water spray is subjected to a surface treatment by a dry etching apparatus. Next, a specimen surface is observed by a scanning electron microscope S-4300SE (manufactured by Hitachi High-technologies Corporation) to which an EBSD system-Digiview (manufactured by TSL Solutions) is attached. As an observation condition, an acceleration voltage is set to 30 kV and a measurement area is set to 500 µm×500 µm. The measurement by the SEM-EBSP is performed on an inner part of a sintered compact. Orientations of all the pixels within a measurement area range are measured at a step size of 2 µm, and a region where a misorientaion between adjacent pixels is less than 5 degrees can be regarded as a crystal grain and a boundary where a misorientaion between adjacent pixels is 5 degrees or more can be regarded as a grain boundary phase.

The composition of the permanent magnet is measured by, for example, an ICP (Inductively Coupled Plasma) emission spectrochemical analysis method, SEM-EDX (SEM-Energy Dispersive X-ray Spectroscopy), TEM-EDX (Transmission Electron Microscope-EDX), or the like. A volume ratio of each phase is judged in a comprehensive manner while using observation by an electron microscope or an optical microscope and X-ray diffraction, etc., and can be found by an areal analysis method of an electron micrograph obtained by photographing a cross section of a permanent magnet. As the cross section of the permanent magnet, there is used a cross section of a practically center part of a surface having a maximum area of the specimen.

The cell phase having the $Th_2Zn_{17}$ crystal phase and the Cu-rich phase are defined as below, for example. First, observation of a sample by a scanning transmission electron microscope (STEM) is carried out. At this time, by observing the sample by SEM, a location of the grain boundary phase is specified, and by processing the sample by using a focused ion beam (FIB) so that the grain boundary phase may come in view, an observation efficiency can be increased. The above-described sample is a sample after an aging treatment. On this occasion, the sample is preferably an unmagnetized one. The observation condition is set to 200 kV in acceleration voltage and 30 µm×30 µm in measurement area, for example.

Figure 3:
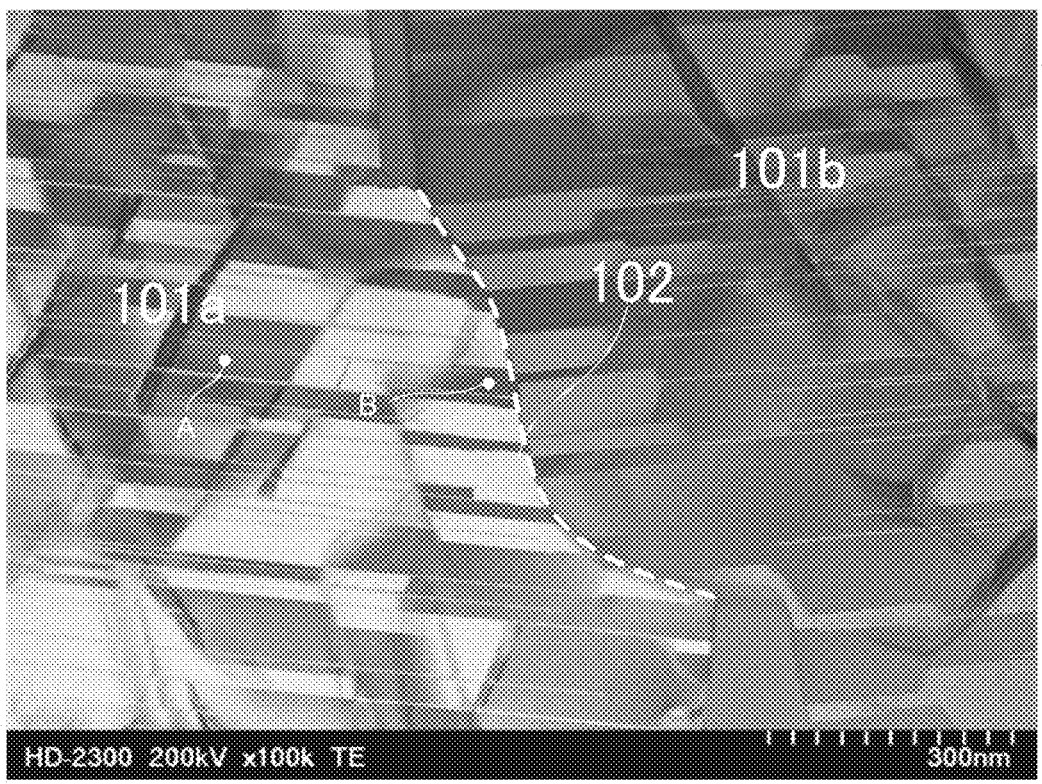
FIG. 3 is a view showing a bright-field image of a cross section including a c-axis of a $Th_2Zn_{17}$ crystal phase which is obtained by STEM observation.

FIG. 3 is a view showing a bright-field image of a cross section including a c-axis of the $Th_2Zn_{17}$ crystal phase which is obtained by STEM observation. The cross section shown in FIG. 3 has a crystal grain 101a, a crystal grain 101b, and a grain boundary phase 102 located between the crystal grain 101a and the crystal grain 101b.

Next, a concentration of each element in the cross section is measured by, for example, a STEM-energy dispersive X-ray spectroscopy (STEM-EDX) using STEM. In measuring the concentration of each element by STEM-EDX, a specimen for measurement is curved from 1 mm or more inside of a surface of the sample. Further, a surface parallel to an easy magnetization axis (c-axis) is observed at an observation magnification of 100 k times.

Figure 4:
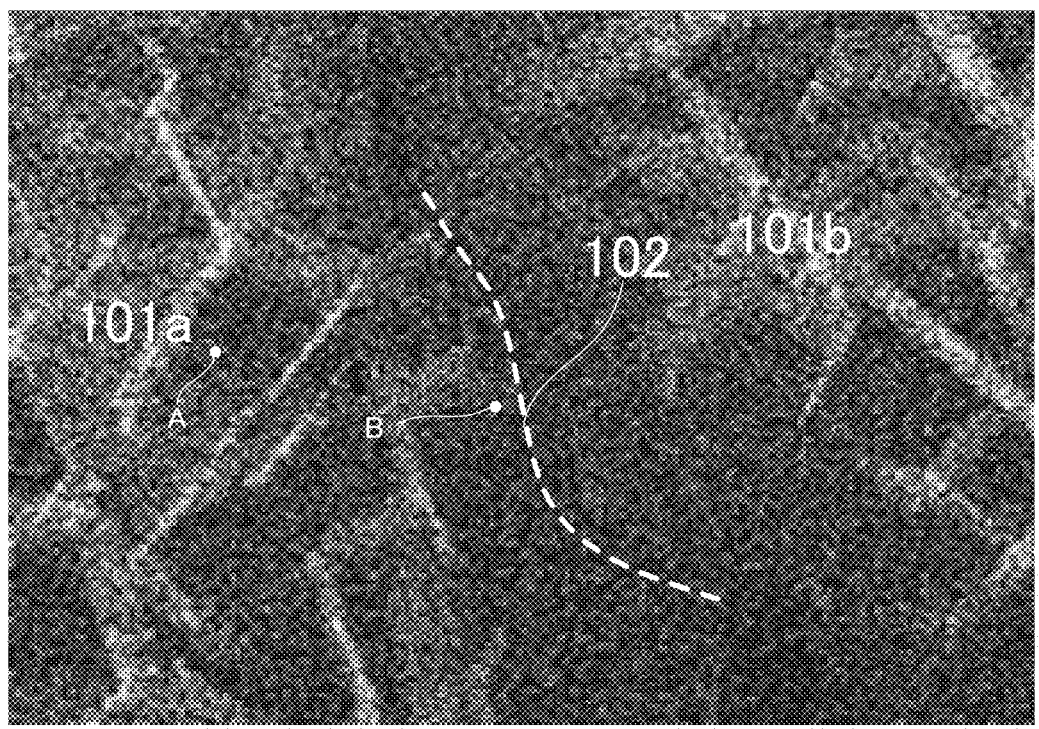
FIG. 4 is a view showing a mapping image of Cu in the same visual field as that of the bright-field image shown in FIG. 3.

FIG. 4 is a view showing a mapping image of Cu in the same visual field as that of the bright-field image shown in FIG. 3. In FIG. 4, a relatively white region of a linear shape or a plate shape is a Cu-rich phase. In an Sm—Co based magnet having an Fe concentration as high as 26 atomic percent or more, as shown in FIG. 3 and FIG. 4, a cell structure is hard to be formed in a neighboring region of the grain boundary phase 102. Thus, a squareness ratio is likely to decrease.

Detailed analysis of the neighboring region of the grain boundary phase reveals that the Cu concentration is lower than in other regions. In the Sm—Co based magnet having the Fe concentration as high as 26 atomic percent or more, a Cu-rich hetero-phase is likely to occur, and thus variation in Cu concentration is likely to occur between the region of the cell phase divided by the Cu-rich phase and the neighboring region of the grain boundary phase. When many Cu-rich hetero-phases exist, the squareness ratio is likely to decrease. Thus, in order to suppress a decrease in squareness ratio, it is demanded to suppress occurrence of the Cu-rich hetero-phase to thereby reduce variety in Cu concentration.

Figure 5:
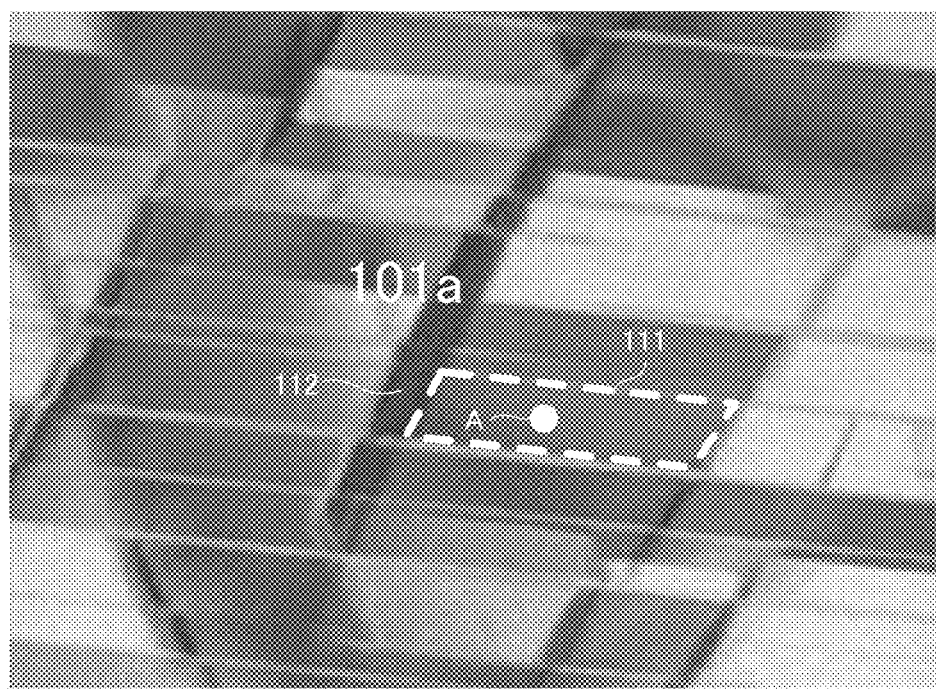
FIG. 5 is a partially enlarged view showing a part of FIG. 3.
Figure 6:
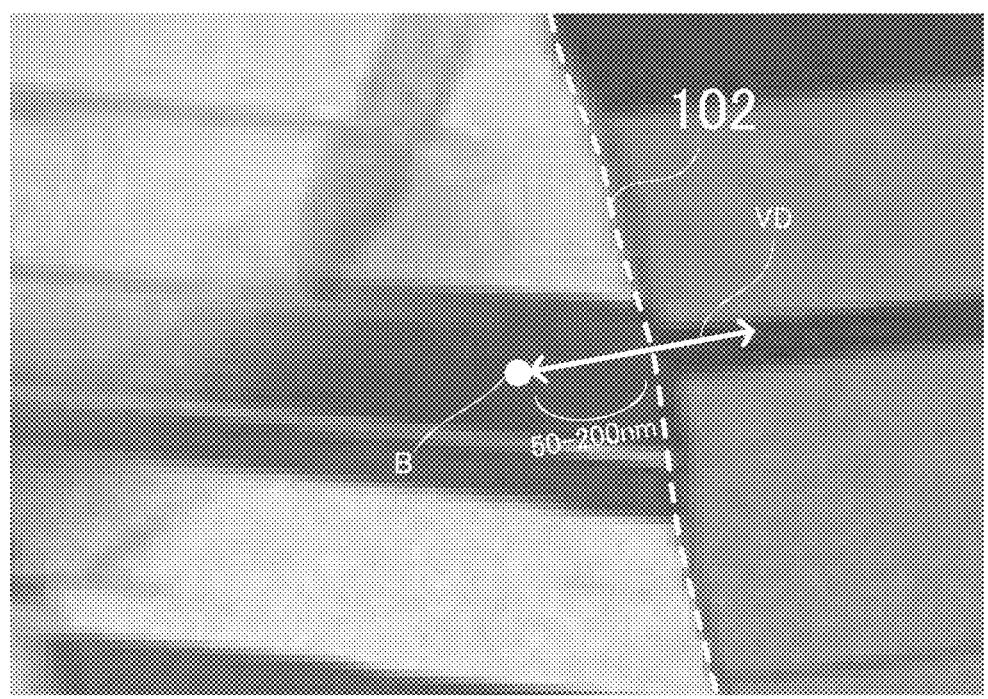
FIG. 6 is a partially enlarged view showing a part of FIG. 3.

FIG. 5 is a partially enlarged view which includes a region of the cell phase divided by the Cu rich phase in FIG. 3, and FIG. 6 is a partially enlarged view which includes a neighboring region of the grain boundary phase in FIG. 3. In the permanent magnet of the this embodiment, a difference between a Cu concentration of a first region (cell phase region) A (see FIG. 5) and a Cu concentration of a second region (grain boundary phase neighboring region) B (see FIG. 6) is 0.5 atomic percent or less, the first region A forming the cell phase 111 divided by the Cu-rich phase 112 in the crystal grain in a cross section including a c-axis of the $Th_2Zn_{17}$ crystal phase, and the second region B being located in the same crystal grain as the crystal grain of the first region A and within a range of 50 nm or more and 200 nm or less from the grain boundary phase 102 in a direction VD perpendicular to an extension direction (broken lines shown in FIG. 3 and FIG. 4) of the grain boundary phase 102 in the above-described cross section. The Fe concentration of the first region A is preferably 26 atomic percent or more, for example. The Cu concentration of the first region A is preferably 1.5 atomic percent or more and 5 atomic percent or less, for example.

The Cu concentration of the first region A is defined by an average value of measured values excluding a maximum value and a minimum value among the measured values of 10 locations. The Cu concentration of the second region B is defined in the same manner. In the permanent magnet having the difference between the Cu concentration of the cell structure region and the Cu concentration of the grain boundary neighboring region within the above-described range, occurrence of a Cu-rich hetero-phase is suppressed, resulting in large improvement of the squareness ratio.

For concentration measurement of the element of each phase, 3 dimension atom probe (3DAP) may be used. An analysis method using the 3DAP is an analysis method in which an observation specimen is field-evaporated by application of a voltage and field-evaporated ions are detected by a two-dimensional detector to thereby specify atomic arrangement. Ion species are identified based on a time of flight until reaching the two-dimensional detector, ions individually detected are consecutively detected in a depth direction, and the ions are arranged in sequence of detection (restructured), whereby a three-dimensional atomic distribution is obtained. In comparison with concentration measurement by TEM-EDX, each element concentration in each crystal phase can be measured more accurately.

Measurement of the element concentration in each phase by 3DAP is carried out in accordance with a procedure shown below. First, a sample is made into a thin piece by dicing, from which an acicular specimen for pickup atom probe (AP) is fabricated by FIB.

Measurement by the 3DAP is performed on an inner part of a sintered compact. Measurement of the inner part of the sintered compact is as follows. First, in a center part of a longest edge in the surface having the maximum area, compositions are measured at a surface part and the inner part of a cross section which is cut perpendicularly to the edge (in the case of a curved line, perpendicularly to a tangent in the center part). As positions of measurement, there are provided a first reference line drawn perpendicular to an edge and inward to an end part from a position of ½ of each edge on the above-described cross section as a start point, and a second reference line drawn inward to an end part from a center of each corner as a start point at a position of ½ of an internal angle of the corner, and each position at 1% of the length of the reference line from the start point of each of these first reference line and second reference line is defined as the surface part and each position at 40% thereof is defined as the inner part. When the corner has a curvature by chamfering or the like, an intersecting point of extended adjacent edges is taken as an end part (center of the corner) of the edge. In this case, the measurement position is a position not from the intersecting point but from a part which is in contact with the reference line.

By setting the measurement positions as above, when the cross section is a quadrangle for example, there are four first reference lines and four second reference lines, eight reference lines in total, and there are eight measurement positions each at the surface part and the inner part. In this embodiment, it is preferable that all of the eight positions at each of the surface parts and the inner parts fall within the above-described composition range, but it is only necessary that at least four positions or more at each of the surface parts and the inner parts fall within the above-stated composition range. In this case, a relation between the surface part and the inner part of one reference line is not defined. An observation surface of the inner part of the sintered compact prescribed as above is smoothed by polishing and then the observation is performed. For example, observation positions of TEM-EDX in concentration measurement are set to arbitrary 20 points in each phase, an average value of measurement values excluding a maximum value and a minimum value from the measured values at each position is found, and this average value is set as a concentration of each element. Measurement of 3DAP is performed based thereon.

In a measurement result of the concentration in the Cu-rich phase using the 3DAP as described above, it is preferable that a concentration profile of Cu in the Cu-rich phase is sharper. Concretely, a full width at half maximum (FWHM) of the concentration profile of Cu is preferably 5 nm or less, and in such a case higher coercive force can be obtained. This is because in the case where distribution of Cu in the Cu-rich phase is sharp, a magnetic domain wall energy difference between the cell phase and the Cu-rich phase occurs rapidly, resulting in that a magnetic domain wall becomes more likely to be pinned.

The full width at half maximum (FWHM) of the concentration profile of Cu in the Cu-rich phase is found as follows. Based on the above-described method, a highest value (PCu) of the Cu concentration is found from the Cu profile of the 3DAP, and a width of a peak whose value is a half value (PCu/2) of this value, that is, the full width at half maximum (FWHM) is found. Such measurement is performed on 10 peaks and an average value of these values is defined as the full width at half maximum (FWHM) of the Cu profile. In the case where the full width at half maximum (FWHM) of the Cu profile is 3 nm or less, an effect of further increasing coercive force is improved, and in the case of 2 nm or less, a further superior improvement effect of coercive force can be obtained.

The squareness ratio is defined as follows. First, a DC magnetizing property at a room temperature is measured by a DC B-H tracer. Next, from a B-H curved line obtained from a measurement result, residual magnetization $M_r$, coercive force $_iH_c$, and a maximum energy product (BH) max being basic properties of a magnet are found. On this occasion, a theoretical maximum value (BH) max is found using $M_r$ by a following formula (1).

$$(BH)\text{max (theoretical value)}=M_r^2/4\mu_o \quad (1)$$

The squareness ratio is evaluated by a ratio between (BH) max obtained by measurement and (BH) max (theoretical value), and is found by a following formula (2).

$$(BH)\text{ max (actual measured value)}/(BH)\text{ max (theoretical value)}\times 100 \quad (2)$$

The above-described permanent magnet is used as a bond magnet, for example. For example, by using the above-described permanent magnet for a variable magnet in a variable magnetic flux drive system disclosed in Japanese Patent Application No. 2008-29148 or Japanese Patent Application No. 2008-43172, a higher efficiency, downsizing, cost reduction, and the like of the system can be achieved. In order to use the above-described permanent magnet as the variable magnet, it is necessary to change an aging treatment condition, for example, to set the coercive force to 100 kA/M or more and 350 kA/M or less.

<Manufacturing Method of Permanent Magnet>

Next, a manufacturing method example of a permanent magnet will be described. First, an alloy powder containing a predetermined element necessary for synthesizing a permanent magnet is prepared. Next, the alloy powder is filled in a mold placed in an electromagnet and is press-formed while a magnetic field is applied thereto, whereby a green compact whose crystal axes are oriented is manufactured.

For example, by grinding an alloy ingot obtained by casting molten metal by an arc melting method or a high-frequency melting method, the alloy powder can be prepared. The alloy powder may have a desired composition by blending a plurality of powders different in composition. Further, the alloy powder may be prepared by using a mechanical alloying method, a mechanical grinding method, a gas atomization method, a reduction diffusion method, and so on. In fabrication of an alloy thin strip using a strip cast method, a flake-shaped alloy thin strip is fabricated and thereafter the alloy thin strip is ground, to thereby prepare the alloy powder. For example, by tiltingly injecting an alloy molten metal to a chill roll rotating at a circumferential speed of 0.1 m/sec or more and 20 m/sec or less, a continuously solidified thin strip with a thickness of 1 mm or less can be fabricated. When the circumferential speed is less than 0.1 m/sec, a composition variation is likely to occur in the thin strip. Further, when the circumferential speed exceeds 20 m/sec, crystal grains become too fine, and therefore a magnetic property may decrease. The circumferential speed of the chill roll is 0.3 m/sec or more and 15 m/sec or less, and further preferably 0.5 m/sec or more and 12 m/sec or less.

Further, performing a heat treatment on the above-described alloy powder or a material of an alloy before grinding makes it possible to homogenize the material. The material can be ground by using, for example, a jet mill, a ball mill or the like. The grinding the material in an inert gas atmosphere or an organic solvent makes it possible to prevent oxidation of the powder.

If the powder obtained after the grinding has an average grain diameter of 2 µm or more and 5 µm or less and a ratio of powder having a grain diameter of 2 µm or more and 10 µm or less is 80% or more of the whole powder, a degree of orientation becomes high and coercive force becomes large. To realize such a powder, grinding by the jet mill is preferable.

For example, in the case of grinding by the ball mill, even if the average grain diameter of the powder is 2 µm or more and 5 µm or less, a large amount of fine powder having a grain diameter on a sub-micron level is contained. When the fine powder aggregates, c-axes of crystals in a $TbCu_7$ phase become unlikely to align in a direction of easy magnetization axis during magnetic field orientation at the time of press-forming, and the degree of orientation is likely to deteriorate. Further, such a fine powder may increase an amount of oxide in a sintered compact to decrease coercive force. In particular, when the Fe concentration is 26 atomic percent or more, a ratio of powder having a grain diameter of 10 µm or more in the powder after the grinding is desirably 10% or less of the whole powder. When the Fe concentration is 26 atomic percent or more, an amount of hetero-phase in the ingot being a raw material increases. In the hetero-phase, not only the amount of powder increases but also the grain diameter tends to increase, and the grain diameter sometimes becomes 20 µm or more.

At the time of grinding such an ingot, for example, a powder having a grain diameter of 15 µm or more sometimes becomes a hetero-phase powder as it is. When the ground powder containing such a hetero-phase coarse powder is pressed in a magnetic field into a sintered compact, the hetero-phase remains to cause decrease in coercive force, decrease in magnetization, decrease in squareness, and so on. The decrease in squareness makes the magnetization difficult. In particular, magnetization after assembly to a rotor or the like becomes difficult. As described above, setting the powder having the grain diameter of 10 µm or more to 10% or less of the whole makes it possible to increase the coercive force while suppressing the decrease in squareness ratio in the high Fe concentration composition containing 26 atomic percent or more Fe.

Next, sintering is performed on the above-described green compact by a heat treatment at a temperature of 1180° C. or more and 1220° C. or less and for 1 hour our more and 15 hours or less. When a sintering temperature is lower than 1180° C., sintering may not proceed sufficiently in a region of high melting point, so that evenness of a metal structure may decrease. When the sintering temperature is higher than 1220° C., a magnetic property may decrease due to excessive evaporation of an element R such as Sm in the powder. The sintering temperature is more preferably 1190° C. or higher and 1210° C. or lower, for example. When a retention time is less than 1 hour, a density is likely to become uneven and therefore magnetization is likely to decrease, further a crystal grain diameter of the sintered compact decreases, a crystal grain boundary phase ratio increases, and therefore the magnetization is likely to decrease. Further, when the retention time exceeds 15 hours, the element R in the powder excessively evaporates and thereby may decrease the magnetic property. The retention time is more preferably 2 hours or more and 13 hours or less, and still more preferably 3 hours or more and 10 hours or less. In the above-described sintering, a vacuum state is made after setting of a molded body in a chamber, a vacuum is kept until close to the retention temperature and thereafter the atmosphere is changed to an inert atmosphere such as of Ar, and isothermal retention is performed, to thereby make it possible to increase a sintered compact density.

Next, a quality improvement treatment is performed, and thereafter a solution treatment is performed. The quality improvement treatment is a treatment to control a metal structure, in particular a macrostructure. In the quality improvement treatment, for example, a heat treatment is performed by retaining the sintered compact at a temperature lower than the heat treatment temperature at the time of sintering by 10° C. or more and at a temperature higher than the heat treatment temperature at the time of solution treatment by 10° C. or more for 2 hours or more and 12 hours or less. When the heat treatment is not performed at the temperature lower than the heat treatment temperature at the time of sintering by 10° C. or more, a hetero-phase derived from a liquid phase which has been generated during sintering cannot be removed sufficiently. An orientation of the hetero-phase is often low, and existence of the hetero-phase makes a crystal orientation of the crystal grain likely to deviate in relation to the easy magnetization axis, and not only the squareness ratio decreases but also the magnetization is likely to decrease. Further, it is difficult to sufficiently remove the hetero-phase generated during the sintering by the solution treatment, where the temperature is low, in view of an element diffusion speed. Further, a grain growth speed is also slow and a sufficient crystal grain diameter may not be able to be obtained, so that improvement of the squareness ratio cannot be expected. In contrast, performing the quality improvement treatment at the temperature higher than the retention temperature at the time of the solution treatment by 10° C. or more enables sufficient removal of the above-described hetero-phase, to be able to make the crystal grain forming the main phase large. The retention temperature at the time of the quality improvement treatment is preferably 1140° C. or more and 1210° C. or less, for example. In the case of less than 1140° C. and in the case of over 1210° C., the squareness ratio may decrease.

In the Sm—Co based permanent magnet of high Fe concentration of 26 atomic percent or more, the retention time of the quality improvement treatment necessary for suppression of the hetero-phase changes largely depending on the Fe concentration (value of q in the composition). This is because an amount of the generated hetero-phase changes largely depending on the Fe concentration. In the manufacturing method of the permanent magnet of this embodiment, a minimum retention time $T_{min}$ of the quality improvement treatment is set by a formula below. A symbol q represents the Fe concentration.

$$T_{min}(\text{hour})=2q-50$$

In other words, the retention time of the quality improvement treatment is preferably (2q–50) hours or more. The retention time less than (2q–50) hours cannot achieve a clear squareness ratio improvement effect. Further, unevenness of the composition makes the Fe concentration in the cell phase lower than in a preparation composition, to be 26 atomic percent or less, so that high magnetization cannot be obtained.

The time (2q–50) hours is preferably 2 hours or more, for example. When a heat retaining treatment time is less than 2 hours, diffusion is insufficient and the hetero-phase is not sufficiently removed, so that the effect of squareness ratio improvement is small. Further, the retention time is preferably 30 hours or less. When the retention time exceeds 30 hours, the element R such as Sm evaporates and thereby a good magnetic property may not be able to be obtained. However, if the retention temperature of the quality improvement treatment is higher than the solution treatment temperature by 10° C. or more and 30° C. or less, deterioration in property is unlikely to occur even in the case of 12 hours or more. In this case, it is only necessary that the retention time is 30 hours or less, for example. The heat treatment time in the quality improvement treatment is more preferably 10 hours or more and 28 hours or less and still more preferably 12 hours or more and 20 hours or less. Further, it is preferable to perform the quality improvement treatment in a vacuum or in an inert atmosphere such as of argon gas, in order for oxidation prevention.

At this time, making a pressure inside the chamber positive pressure in the quality improvement treatment brings about a higher effect of suppressing occurrence of the hetero-phase. Excessive evaporation of the element R can be suppressed thereby, and decrease in coercive force can be suppressed. The pressure inside the chamber is preferably 0.15 MPa or more and 15 MPa or less, more preferably 0.2 MPa or more and 10 MPa or less, and still more preferably 1.0 MPa or more and 5.0 MPa or less, for example.

Next, the solution treatment is performed. The solution treatment is a treatment to form a $TbCu_7$ crystal phase (1-7 crystal phase) being a precursor of a phase-separation structure. In the solution treatment, the sintered compact is retained at a temperature of 1090° C. or more and 1130° C. or less for 3 hours or more and 28 hours or less.

When the temperature of the solution treatment is lower than 1090° C. or exceeds 1130° C., a ratio of the $TbCu_7$ crystal phases existing in the specimen after the solution treatment is small and therefore the magnetic property may decrease. The temperature of the solution treatment is more preferably 1100° C. or more and 1130° C. or less, for example. When the retention time at the time of the solution treatment is less than 3 hours, a constituent phases are likely to become uneven, the coercive force is likely to decrease, the crystal grain diameter of the metal structure is likely to become small, a grain boundary phase ratio becomes high, and therefore the magnetization is likely to decrease. Further, when the retention temperature at the time of the solution treatment exceeds 28 hours, the magnetic property may decrease due to evaporation of the element R in the sintered compact, or the like. The retention time is preferably 12 hours or more and 18 hours or less. The performing the solution treatment in a vacuum or an inert atmosphere such as of argon gas makes it possible to suppress oxidation of the powder.

Further, rapid cooling is performed after the isothermal retention. Performing rapid cooling to a room temperature at a cooling rate of 170° C./min or more, for example, makes it possible to stabilize the $TbCu_7$ crystal phase and therefore coercive force becomes likely to be exerted. When the cooling rate is less than 170° C./min, a $Ce_2Ni_7$ crystal phase (2-7 crystal phase) is likely to be generated during the cooling. The existence of the 2-7 crystal phase may decrease the magnetization and may also decrease the coercive force. This is because in the 2-7 crystal phase Cu is often concentrated and thereby the Cu concentration in a main phase decreases to make phase separation by an aging treatment unlikely to occur. In particular, in the composition containing 26 atomic percent or more Fe, the cooling rate is likely to be important.

It is preferable that the rapid cooling is not performed from the quality improvement treatment temperature to the solution treatment temperature. For example, it is preferable to cool gradually to the solution treatment temperature at a rate of 15° C./min or less. The cooling rate is more preferably 10° C./min or less, and further, 5° C./min or less. Setting the cooling rate low makes the metal structure even, clarifying an improvement effect of the squareness ratio.

Next, the sintered compact after the rapid cooling is subjected to an aging treatment. The aging treatment is a treatment to enhance the coercive force of the magnet by controlling the metal structure, and is intended to phase-separate the metal structure of the magnet into a plurality of phases.

In the aging treatment, the sintered compact is heated to a temperature of 760° C. or more and 850° C. or less and thereafter retained at that attained temperature for 20 hours or more and 60 hours or less (first retention). Next, after slow cooling is performed to a temperature of 350° C. or more and 650° C. or less at a cooling rate of 0.2° C./min or more and 2.0° C./min or less, the sintered compact is retained at an attained temperature for 0.5 hours or more and 8 hours or less (second retention), whereby a heat treatment is performed. Thereafter, the sintered compact is cooled to the room temperature. Thereby, a sintered compact magnet can be obtained.

In the first retention, when the retention temperature is higher than 850° C., the cell phase becomes coarse and therefore the squareness ratio is likely to decrease. Further, when the retention temperature is lower than 760° C., a cell structure cannot be obtained sufficiently and therefore the coercive force becomes difficult to be exerted. The retention temperature in the first retention is more preferably 780° C. or more and 840° C. or less, for example. Further, in the first retention, when the retention time is less than 20 hours, the cell structure becomes insufficient, and therefore the coercive force becomes difficult to be exerted. Further, when the retention time is more than 60 hours, a cell wall phase becomes excessively thick, and therefore the squareness ratio may deteriorate. The retention time in the first retention is more preferably 25 hours or more and 40 hours or less, for example When the cooling rate at the time of slow cooling is less than 0.2° C./min, the cell wall phase becomes excessively thick and therefore magnetization is likely to decrease. Further, in the case of over 2.0° C./min, a difference between Cu concentrations of the cell phase and the cell wall phase cannot be obtained sufficiently, and thereby the coercive force is likely to decrease. The cooling rate at the time of slow cooling is more preferably 0.4° C./min or more and 1.5° C./min or less, and further, 0.5° C. or more and 1.3° C. or less, for example. Further, when the slow cooing is performed to lower than 350° C., the low temperature hetero-phase described above is likely to be generated. Further, when the slow cooling is performed to a temperature over 650° C., the Cu concentration in the Cu-rich phase does not become sufficiently high, and therefore sufficient coercive force may not be obtained. Further, when the retention time in the second retention exceeds 8 hours, a low temperature hetero-phase may be generated and therefore a sufficient magnetic property may not be able to be obtained.

In the aging treatment, the sintered compact may be retained at a predetermined temperature for a certain period at the time of slow cooling and then slow cooling may be further performed. Further, setting the above-described aging treatment as a main aging treatment, a preliminary aging treatment may be performed before the main aging treatment by retaining the sintered compact at a temperature lower than the retention temperature in the first retention and for a time shorter than the retention time in the first retention. It is possible to make the squareness ratio even higher by retention at the time of the above-described slow cooling and the preliminary aging treatment.

It is only necessary that the quality improvement treatment is performed after sintering and before the aging treatment. For example, the solution treatment may be divided into a first solution treatment and a second solution treatment (also referred to as a re-solution treatment), the quality improvement treatment may be performed after the first solution treatment and the second solution treatment may be performed after the quality improvement treatment. Further, a plurality of quality improvement treatments may be performed between the solution treatments.

In the above-described manufacturing method of the permanent magnet, by adjusting conditions of the quality improvement treatment and the solution treatment, it is possible to control a difference between a Cu concentration of a first region (cell structure region) A and a Cu concentration of a second region (grain boundary phase neighboring region) B to be 0.5 atomic percent or less, the first region A forming the cell phase 111 divided by the Cu-rich phase 112 in the crystal grain in a cross section including a c-axis of the $Th_2Zn_{17}$ crystal phase, and the second region B being located in the same crystal grain as the crystal grain of the first region A and within a range of 50 nm or more and 200 nm or less from the grain boundary phase 102 in a direction VD perpendicular to an extension direction (broken lines shown in FIG. 3 and FIG. 4) of the grain boundary phase 102 in the cross section. Therefore, the magnetic property such as a squareness ratio can be improved.

Second Embodiment

The permanent magnets of the first embodiment can be used for rotary electrical machines such as various motors and a power generator which vehicles such as an automobile and a railway vehicle have. Further, it is also possible to use as a stationary magnet or a variable magnet of a variable magnetic flux motor or a variable magnetic flux power generator. Usage of the permanent magnets of the first embodiment configures various motors and power generators. When the permanent magnet of the first embodiment is applied to the variable magnetic flux motor, technologies disclosed in Japanese Patent Application No. 2008-29148 and Japanese Patent Application No. 2008-43172, for example, can be applied to a configuration of the variable magnetic flux motor and a driving system.

Figure 7:
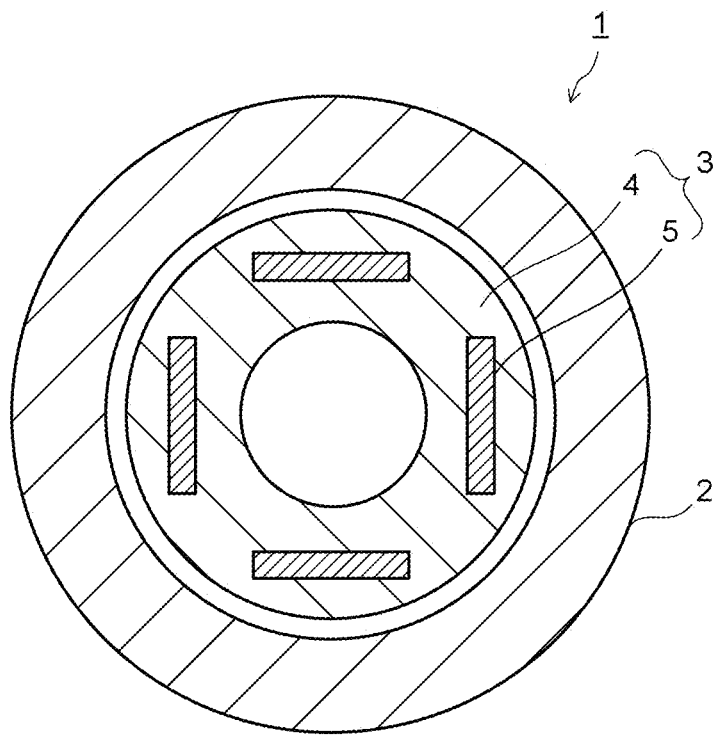
FIG. 7 is a view illustrating a permanent magnet motor.

Next, the rotary electrical machine which has the above-described permanent magnet will be described with reference to the drawings. FIG. 7 is a view illustrating a permanent magnet motor in this embodiment. In the permanent magnet motor 1 shown in FIG. 7, a rotor 3 is disposed in a stator 2. A permanent magnet 5 being the permanent magnet of the first embodiment is disposed in an iron core 4 of the rotor 3. Usage of the permanent magnet of the first embodiment enables a higher efficiency, down-sizing, cost reduction, and so on of the permanent magnet motor 1 based on a property or the like of each permanent magnet.

Figure 8:
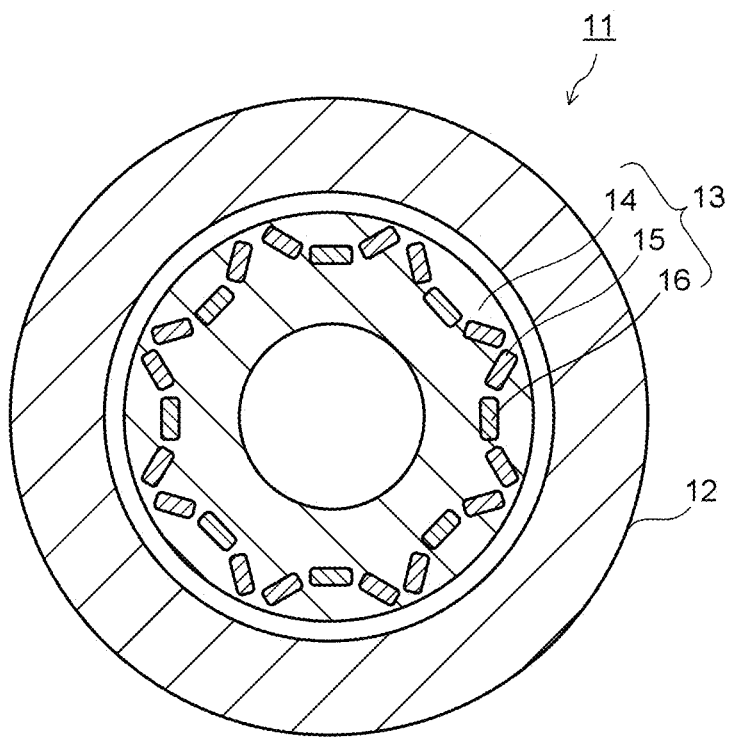
FIG. 8 is a view illustrating a variable magnetic flux motor.

FIG. 8 is a view illustrating a variable magnetic flux motor according to this embodiment. In the variable magnetic flux motor 11 illustrated in FIG. 8, a rotor 13 is disposed in a stator 12. The permanent magnets of the first embodiment are disposed as a stationary magnet 15 and a variable magnet 16 in an iron core 14 of the rotor 13. A magnetic flux density (magnetic flux amount) of the variable magnet 26 can be variable. The variable magnet 16 is not influenced by a Q-axis current because its magnetization direction is perpendicular to a Q-axis direction, and can be magnetized by a D-axis current. In the rotor 13, a magnetization winding (not illustrated) is provided. It is configured that when a current is passed through the magnetization winding from a magnetizing circuit, its magnetic field acts directly on the variable magnets 16.

According to the permanent magnet of the first embodiment, coercive force suitable for the stationary magnet 15 can be obtained. When the permanent magnet of the first embodiment is applied to the variable magnet 16, it is only necessary to control the coercive force, for example, to a range of 100 kA/m or more and 500 kA/m or less by changing the various conditions (aging treatment condition and so on) of the aforementioned manufacturing method. In the variable magnetic flux motor 11 illustrated in FIG. 8, the permanent magnet of the first embodiment is usable as both of the stationary magnet 15 and the variable magnet 16, and the permanent magnet of the first embodiment may be used as either one of the magnets. The variable magnetic flux motor 11 is capable of outputting large torque with a small device size and thus is suitable for vehicle motors of hybrid vehicles, electric vehicles and so on whose motors are required to have a high output and a small size.

Figure 9:
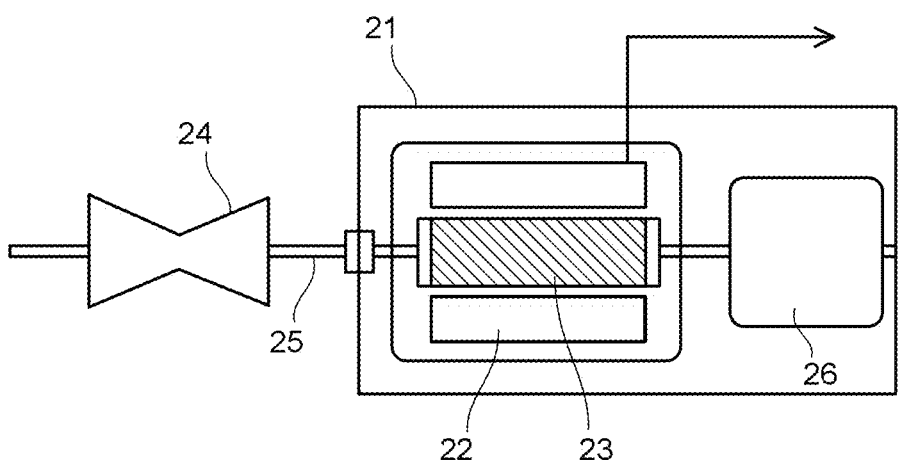
FIG. 9 is a view illustrating a power generator.

FIG. 9 illustrates a power generator according to this embodiment. A power generator 21 illustrated in FIG. 9 includes a stator 22 using the above-described permanent magnet. A rotor 23 disposed inside the stator 22 is connected via a shaft 25 to a turbine 24 provided at one end of the power generator 21. The turbine 24 is rotated by an externally supplied fluid, for example. Instead of the turbine 24 rotated by the fluid, the shaft 25 can also be rotated by transmitting dynamic rotation such as regenerative energy of a vehicle such as an automobile or the like. As the stator 22 and the rotor 23, various publicly known structures are adoptable.

The shaft 25 is in contact with a commutator (not illustrated) disposed on an opposite side of the turbine 24 in relation to the rotor 23, so that electromotive force generated by the rotation of the rotor 23 is boosted to a system voltage and transmitted as an output of the power generator 21 via an isolated phase bus and a traction transformer (not illustrated). The power generator 21 may be either of an ordinary power generator and a variable magnetic flux power generator. The rotor 23 is electrically charged due to static electricity from the turbine 24 and a shaft current accompanying the power generation. Therefore, the power generator 21 includes a brush 26 for discharging charged electricity of the rotor 23.

As described above, applying the above-described permanent magnet to the power generator provides effects such as an increased efficiency, down-sizing, cost reduction and so on.

Figure 10:
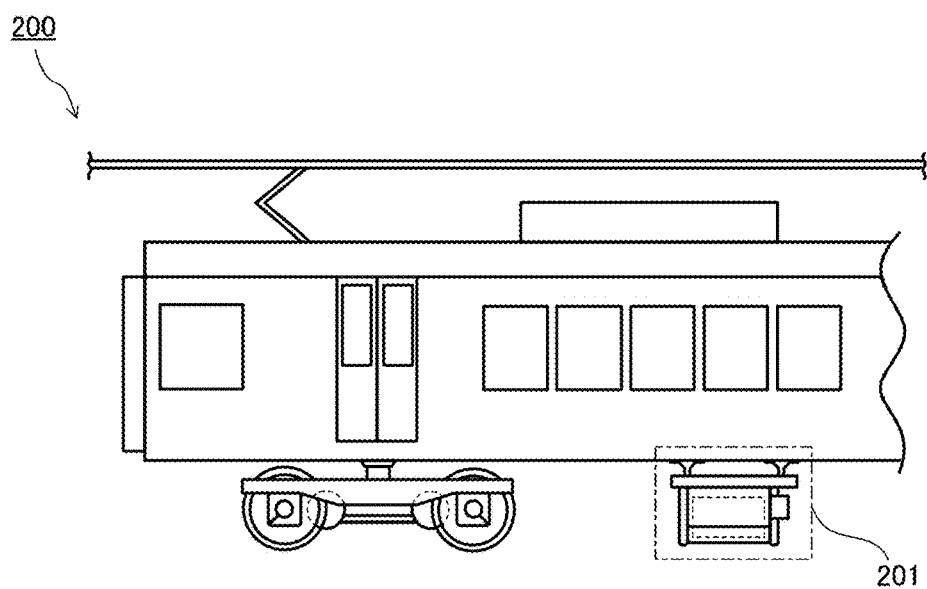
FIG. 10 is a schematic view illustrating a configuration example of a vehicle.

The above-described rotary electrical machine may be mounted on a railway vehicle (an example of the vehicle) used for railway traffic, for example FIG. 10 is a view illustrating an example of a railway vehicle 200 which has a rotary electrical machine 201. Examples of the rotary electrical machine 201 include the motors of FIGS. 7, 8 and the power generator of FIG. 9. When the above-described rotary electrical machine is mounted as the rotary electrical machine 201, the rotary electrical machine 201 may be used as a motor which outputs drive force by using electric power supplied from a transmission line or electric power supplied from a secondary battery mounted on the railway vehicle 200, for example, or may be used as a generator which supplies electric power to various loads in the railway vehicle 200 by converting kinetic energy into electric power. Using the highly efficient rotary electrical machine such as a rotary electrical machine of the embodiment enables energy-saving running of the railway vehicle.

Figure 11:
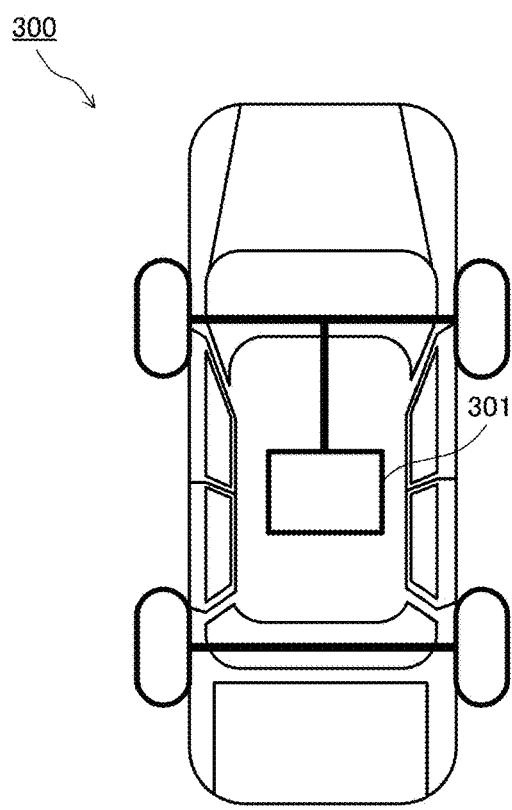
FIG. 11 is a schematic view illustrating a configuration example of a vehicle.

The above-described rotary electrical machine may be mounted on an automobile (another example of the vehicle) such as a hybrid vehicle or an electric vehicle. FIG. 11 is a view illustrating an example of an automobile 300 which has a rotary electrical machine 301. Examples of the rotary electrical machine 301 include the motors of FIGS. 7, 8 and the power generator of FIG. 9. When the above-described rotary electrical machine is mounted as the rotary electrical machine 301, the rotary electrical machine 301 may be used as a motor which outputs drive force of the automobile 300 or a generator which converts kinetic energy at the time of running of the automobile 300 into electric power.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes may be made without departing from the spirit of the inventions. These embodiments and their modifications fall within the scope and spirit of the inventions and fall within the scope of the inventions described in claims and their equivalents.

EXAMPLES

Example 1 and Example 2

Respective raw materials to be used for the permanent magnet were weighed and mixed at predetermined ratios and were then subjected to arc-melting in an Ar gas atmosphere, whereby alloy ingots were fabricated. The alloy ingots were retained at 1170° C. for 10 hours and thereby subjected to a heat treatment, and the alloy ingots were then coarsely ground and ground by a jet mill, whereby alloy powders as raw material powders of magnets were prepared. The obtained alloy powders were press-formed in a magnetic field, whereby compression-molded bodies were fabricated.

Next, the compression-molded bodies of the alloy powders were disposed in a chamber of a sintering furnace, the inside of the chamber was brought to a vacuum state of $8.0 \times 10^{-3}$ Pa, and then the compression-molded bodies were heated to 1170° C. and retained at an attained temperature for 15 minutes. Thereafter, Ar gas was led thereinto, the compression-molded bodies were heated to 1200° C. in an Ar atmosphere and retained at an attained temperature for 6 hours to thereby perform a quality improvement treatment. Next, the compression-molded bodies were cooled to 1185° C. and retained at an attained temperature for 6 hours equivalent to (2q−50) hours or more as listed in Table 2, to thereby perform a quality improvement treatment. Next, the compression-molded bodies were subjected to slow cooling to 1160° C. at a cooling rate of 5° C./min as listed in Table 2 and retained at an attained temperature for 12 hours to perform a solution treatment, and thereafter cooling is performed to a room temperature. A cooling rate after the solution treatment was 160° C./min Next, sintered compacts after the solution treatment were heated to 760° C., retained at an attained temperature for 2 hours, and thereafter subjected to slow cooling to 400° C. at a cooling rate of 1.2° C./min Next, as an aging treatment, the sintered compacts were heated to 830° C. and retained at an attained temperature for 30 hours. Thereafter, the sintered compacts were subjected to slow cooling to 500° C. at a cooling rate of 1.0° C./min and retained at an attained temperature for 2 hours. Thereafter, the sintered compacts were subjected to slow cooling to 400° C. at a cooling rate of 1.0° C./min, and retained at an attained temperature for 1 hour. Thereafter, the sintered compacts were furnace-cooled to a room temperature and thereby a magnet was obtained.

Composition analysis of the magnet was performed by an ICP method. The composition analysis by the ICP method was performed in accordance with the following procedure. First, a specimen picked up from a described measurement point was ground in a mortar, a predetermined amount of the ground specimen was weighed and put into a quartz beaker. Further, a mixed acid (acid containing nitric acid and hydrochloric acid) was put into the beaker and heated to about 140° C. on a hotplate, whereby the specimen in the beaker was completely melted. The above was left standing to cool, then transferred to a PFA (polytetrafluoroethylene) volumetric flask, and quantified to be a specimen solution.

Quantities of components of the specimen solution were determined by a calibration curve method using an ICP emission spectrochemical analyzer. As the ICP emission spectrochemical analyzer, SPS4000 manufactured by SR Nano Technology Inc. was used. Compositions of the obtained magnets are as listed in Table 1. Further, a difference between Cu concentrations of the first region A and the second region B, and further, a squareness ratio, coercive force, and residual magnetization were measured. Results thereof are listed in Table 3. HD2300 manufactured by Hitachi High-Technologies Corporation was used as a measurement apparatus in each example and comparative example.

Example 3, Example 4, Example 5

Respective raw materials were weighed and mixed at predetermined ratios and then subjected to high-frequency melting in an Ar gas atmosphere, whereby alloy ingots were fabricated. The alloy ingots were coarsely ground, then heat-treated at 1180° C. for 10 hours, and cooled to a room temperature by rapid cooling. Further, the above were coarsely ground and ground by a jet mill, whereby alloy powders as raw material powders of magnets were prepared. Further, the alloy powders were press-formed in a magnetic field, whereby compression-molded bodies were fabricated.

Next, the compression-molded bodies of the alloy powders were disposed in a chamber of a sintering furnace, the inside of the chamber was brought to a vacuum state of $9.0\times10^{-3}$ Pa and then the compression-molded bodies were heated to 1170° C. and retained at an attained temperature for 30 minutes, and then Ar gas was led into the chamber. The compression-molded bodies were heated to 1195° C. in an Ar atmosphere and retained at an attained temperature for 6 hours to thereby perform sintering. Next, the compression-molded bodies were cooled to 1160° C. and retained at an attained temperature for 13 hours equivalent to (2q–50) hours or more as listed in Table 2, to thereby perform a quality improvement treatment. Next, the compression-molded bodies were subjected to slow cooling to 1140° C. at a cooling rate of 4° C./min as listed in Table 2 and retained at an attained temperature for 16 hours to perform a solution treatment, and thereafter cooled to the room temperature. A cooling rate after the solution treatment was set to 150° C./min.

Next, sintered compacts after the solution treatment were heated to 710° C., retained at an attained temperature for 3 hours, and thereafter subjected to slow cooling to 420° C. at a cooling rate of 2° C./min. Next, as an aging treatment, the sintered compacts were heated to 820° C. and retained at an attained temperature for 45 hours. Thereafter, the sintered compacts were subjected to slow cooling to 420° C. at a cooling rate of 0.5° C./min and retained at an attained temperature for 2 hours. Thereafter, the sintered compacts were subjected to slow cooing to 390° C. at a cooling rate of 0.3° C./min and retained at an attained temperature for 1 hour. Thereafter, the sintered compacts were furnace-cooled to a room temperature, whereby magnets were obtained.

Further, quantities of components of the above-described specimen solution were determined by a calibration curve method using the ICP emission spectrochemical analyzer. Compositions of the obtained magnets are listed in Table 1. Further, a difference between Cu concentrations of the first region A and the second region B, and further, a squareness ratio, coercive force, and residual magnetization were measured. Results thereof are listed in Table 3.

Example 6, Example 7

Respective raw materials were weighed and mixed at predetermined ratios and then subjected to high-frequency melting in an Ar gas atmosphere, whereby alloy ingots were fabricated. The alloy ingots were coarsely ground, then heat-treated at 1175° C. for 12 hours, and cooled to a room temperature by rapid cooling. Further, the above were coarsely ground and ground by a jet mill, whereby alloy powders as raw material powders of magnets were prepared. Further, the alloy powders were press-formed in a magnetic field, whereby compression-molded bodies were fabricated.

Next, the compression-molded bodies of the alloy powders were disposed in a chamber of a sintering furnace, the inside of the chamber was brought to a vacuum state of $8.0\times10^{-3}$ Pa and then the compression-molded bodies were heated to 1160° C. and retained at an attained temperature for 15 minutes, and then Ar gas was led into the chamber. The compression-molded bodies were heated to 1185° C. in an Ar atmosphere and retained at an attained temperature for 4 hours to perform sintering. Next, the compression-molded bodies were cooled to 1160° C. and retained for 18 hours equivalent to (2q–50) or more as listed in Table 2, to thereby perform a quality improvement treatment. Next, the compression-molded bodies were subjected to slow cooling to 1130° C. at a cooling rate of 4° C./min and retained at an attained temperature for 12 hours to perform a solution treatment, and thereafter cooled to a room temperature. A cooling rate after the solution treatment was set to 200° C./min Next, the sintered compacts after the solution treatment were heated to 670° C., retained at an attained temperature for 1 hour, then heated to 845° C. as an aging treatment, and retained at an attained temperature for 50 hours. Thereafter, the sintered compacts were subjected to slow cooling to 400° C. at a cooling rate of 0.6° C./min and retained at an attained temperature for 1 hour. Thereafter, the sintered compacts were subjected to slow cooling to 0.4° C. at a cooling rate of 350° C./min and retained at an attained temperature for 1 hour. Thereafter, the sintered compacts were furnace-cooled to a room temperature, whereby magnets were obtained.

Compositions of the respective magnets described above were confirmed by the ICP method similarly to other examples. The compositions of the obtained magnets are listed in Table 1. Further, similarly to other examples, a difference between Cu concentrations of the first region A and the second region B, and further, a squareness ratio, coercive force, and residual magnetization were measured. Results thereof are listed in Table 3.

Example 8

Respective raw materials were weighed and mixed at predetermined ratios and then subjected to high-frequency melting in an Ar gas atmosphere, whereby an alloy ingot was fabricated. The alloy ingot was coarsely ground, then heat-treated at 1165° C. for 8 hours, and cooled to a room temperature by rapid cooling. Further, the above was coarsely ground and ground by a jet mill, whereby an alloy powder as a raw material powder of a magnet was prepared. Further, the alloy powder was press-formed in a magnetic field, whereby a compression-molded body was fabricated.

Next, the compression-molded body of the alloy powder was disposed in a chamber of a sintering furnace, the inside of the chamber was brought to a vacuum state of $9.0\times10^{-3}$ Pa and then the compression-molded body was heated to 1160° C. and retained at an attained temperature for 30 minutes, and then Ar gas was led into the chamber. The compression-molded body was heated to 1195° C. in an Ar atmosphere and retained at an attained temperature for 4 hours to thereby perform sintering. Next, the compression-molded body was cooled to 1170° C. at a cooling rate of 5° C./min and retained for 16 hours equivalent to (2q–50) hours or more as listed in Table 2, to thereby perform a quality improvement treatment. Next, the compression-molded body was subjected to slow cooling to 1130° C. and retained at an attained temperature for 12 hours to perform a solution treatment, and thereafter cooled to a room temperature. A cooling rate after the solution treatment was set to 170° C./min Next, the sintered compact after the solution treatment was heated to 720° C. and retained at an attained temperature for 2 hours, and then heated to 830° C. as an aging treatment, and retained at an attained temperature for 45 hours. Thereafter, the sintered compact was subjected to slow cooling to 600° C. at a cooling rate of 0.8° C./min and retained at an attained temperature for 4 hours. Thereafter, the sintered compact was subjected to slow cooling to 400° C. at a cooling rate of 0.5° C./min and retained at an attained temperature for 1 hour. Thereafter, the sintered compact was furnace-cooled to a room temperature, whereby a magnet was obtained.

Compositions of the respective magnets described above were confirmed by the ICP method similarly to other examples. The compositions of the obtained magnets are listed in Table 1. Further, similarly to other examples, a difference between Cu concentrations of the first region A and the second region B, and further, a squareness ratio, coercive force, and residual magnetization were measured. Results thereof are listed in Table 3.

Example 9 to Example 12

Alloy powders having the same composition as that of Example 8 were used as raw materials and press-formed in a magnetic field, whereby compression-molded bodies were fabricated. Next, the compression-molded bodies of the alloy powders were disposed in a chamber of a sintering furnace, the inside of the chamber was brought to a vacuum state of $9.0 \times 10^{-3}$ Pa and then the compression-molded bodies were heated to 1160° C. and retained at an attained temperature for 30 minutes, and then Ar gas was led into the chamber. Next, the compression-molded bodies were heated to 1195° C. in an Ar atmosphere and retained at an attained temperature for 4 hours to thereby perform sintering.

Next, the compression-molded bodies were cooled to 1170° C. and retained at an attained temperature for each time listed in Table 2, the time being longer than (2q−50) hours as listed in Table 2, to thereby perform a quality improvement treatment. Next, the compression-molded bodies were subjected to slow cooling to 1130° C. at a cooling rate listed in Table 2 and retained at an attained temperature for 12 hours to thereby perform a solution treatment, and thereafter cooled to a room temperature. A cooling rate after the solution treatment was 170° C./min.

Thereafter, sintered compacts after the solution treatment were subjected to an aging treatment in the respective examples by a method similar to that of the example 8, whereby magnets were obtained.

Compositions of the respective magnets described above were confirmed by the ICP method similarly to other examples. The compositions of the obtained magnets are listed in Table 1. Further, similarly to other examples, a difference between Cu concentrations of the first region A and the second region B, and further, a squareness ratio, coercive force, and residual magnetization were measured. Results thereof are listed in Table 3.

Comparative Example 1, Comparative Example 2

Magnets having compositions listed in Table 1 were fabricated by the same methods as those of Example 1 and Example 2, respectively. Further, a difference between Cu concentrations of a first region A and a second region B, further, a squareness ratio, coercive force, and residual magnetization are measured similarly to the examples. Results thereof are listed in Table 3.

Comparative Example 3 to Comparative Example 5

Alloy powders having the same composition as that of Example 8 were used as raw materials and press-formed in a magnetic field, whereby compression-molded bodies were fabricated. Next, the compression-molded bodies of the alloy powders were disposed in a chamber of a sintering furnace, the inside of the chamber was brought to a vacuum state of $9.0 \times 10^{-3}$ Pa and then the compression-molded bodies were heated to 1160° C. and retained at an attained temperature for 30 minutes, and then Ar gas was led into the chamber. Next, the compression-molded bodies were heated to 1195° C. in an Ar atmosphere and retained at an attained temperature for 4 hours to thereby perform sintering.

Thereafter, a quality improvement treatment was performed for a retention time listed in Table 2 under conditions similar to those of the example 8 other than the retention time, and slow cooling and a solution treatment were performed at a cooling rate listed in Table 2 under conditions similar to those of the example 8 other than the cooling rate, and thereafter, an aging treatment was performed under similar conditions to those of the example 8, whereby magnets were obtained.

Compositions of the respective magnets described above were confirmed by the ICP method similarly to other examples. The compositions of the obtained magnets are listed in Table 1. Further, similarly to other examples, a difference between Cu concentrations of the first region A and the second region B, and further, a squareness ratio, coercive force, and residual magnetization were measured. Results thereof are listed in Table 3.

As is known from Table 1 to Table 3, the permanent magnet of each example exerts a good squareness ratio, high coercive force, and high magnetization even in the case of having a composition with the Fe concentration of 26 atomic percent or more, as a result that a variation in Cu concentration is controlled to suppress decrease in magnetization.

TABLE 1

Magnet composition (atomic ratio)
(Others) Example 1: Nd, Example 2: Ti, Example 3: Ni, Example 4: Cr,
Example 5: Al + Cr, Comparative Example 1: Cr, Comparative Example 2: Ti)

|  | Sm | Co | Fe | Cu | Zr | Other |
|---|---|---|---|---|---|---|
| Example 1 | 10.89 | 54.27 | 26.22 | 5.29 | 3.11 | 0.22 |
| Example 2 | 12.20 | 53.92 | 26.34 | 5.71 | 1.61 | 0.22 |
| Example 3 | 10.81 | 53.57 | 28.99 | 4.91 | 1.47 | 0.25 |
| Example 4 | 11.56 | 53.11 | 29.36 | 4.07 | 1.77 | 0.13 |
| Example 5 | 11.49 | 45.29 | 29.21 | 12.39 | 1.50 | 0.12 |
| Example 6 | 11.83 | 50.61 | 30.86 | 5.11 | 1.59 | 0.00 |
| Example 7 | 11.70 | 49.45 | 32.05 | 5.30 | 1.50 | 0.00 |
| Example 8 | 11.76 | 51.25 | 30.26 | 5.12 | 1.61 | 0.00 |
| Example 9 | 11.76 | 51.25 | 30.26 | 5.12 | 1.61 | 0.00 |
| Example 10 | 11.76 | 51.25 | 30.26 | 5.12 | 1.61 | 0.00 |
| Example 11 | 11.76 | 51.25 | 30.26 | 5.12 | 1.61 | 0.00 |
| Example 12 | 11.76 | 51.25 | 30.26 | 5.12 | 1.61 | 0.00 |
| Comparative Example 1 | 12.56 | 53.22 | 25.72 | 5.19 | 3.05 | 0.26 |
| Comparative Example 2 | 12.20 | 50.26 | 26.34 | 5.71 | 5.27 | 0.22 |
| Comparative Example 3 | 11.76 | 51.25 | 30.26 | 5.12 | 1.61 | 0.00 |

TABLE 1-continued

Magnet composition (atomic ratio)
(Others) Example 1: Nd, Example 2: Ti, Example 3: Ni, Example 4: Cr,
Example 5: Al + Cr, Comparative Example 1: Cr, Comparative Example 2: Ti)

|  | Sm | Co | Fe | Cu | Zr | Other |
|---|---|---|---|---|---|---|
| Comparative Example 4 | 11.76 | 51.25 | 30.26 | 5.12 | 1.61 | 0.00 |
| Comparative Example 5 | 11.76 | 51.25 | 30.26 | 5.12 | 1.61 | 0.00 |

TABLE 2

|  | 2q-50 | Quality improvement treatment time (hour) | Cooling rate after quality improvement treatment (° C./min) |
|---|---|---|---|
| Example 1 | 2.44 | 6 | 5 |
| Example 2 | 2.68 | 6 | 5 |
| Example 3 | 7.98 | 13 | 8 |
| Example 4 | 8.72 | 13 | 8 |
| Example 5 | 8.42 | 13 | 8 |
| Example 6 | 11.72 | 18 | 4 |
| Example 7 | 14.10 | 18 | 4 |
| Example 8 | 10.52 | 16 | 5 |
| Example 9 | 10.52 | 12 | 5 |
| Example 10 | 10.52 | 20 | 5 |
| Example 11 | 10.52 | 16 | 2 |
| Example 12 | 10.52 | 16 | 12 |
| Comparative Example 1 | 1.44 | 6 | 5 |
| Comparative Example 2 | 2.68 | 6 | 5 |
| Comparative Example 3 | 10.52 | 4 | 5 |
| Comparative Example 4 | 10.52 | 32 | 5 |
| Comparative Example 5 | 10.52 | 16 | 20 |

TABLE 3

|  | Cu concentration difference (atomic percent) | Squareness ratio (%) | Coercive force iHc (kA/m) | Residual magnetization Br (T) |
|---|---|---|---|---|
| Example 1 | 0.31 | 94.1 | 1880 | 1.19 |
| Example 2 | 0.36 | 93.9 | 1850 | 1.195 |
| Example 3 | 0.3 | 93.2 | 1790 | 1.21 |
| Example 4 | 0.32 | 93 | 1840 | 1.215 |
| Example 5 | 0.29 | 93.1 | 1780 | 1.21 |
| Example 6 | 0.4 | 94.2 | 1720 | 1.23 |
| Example 7 | 0.41 | 93.8 | 1650 | 1.24 |
| Example 8 | 0.37 | 94.1 | 1750 | 1.235 |
| Example 9 | 0.43 | 93.8 | 1710 | 1.235 |
| Example 10 | 0.24 | 94.4 | 1800 | 1.235 |
| Example 11 | 0.21 | 94.2 | 1780 | 1.235 |
| Example 12 | 0.41 | 93.9 | 1700 | 1.235 |
| Comparative Example 1 | 0.95 | 70 | 280 | 1.12 |
| Comparative Example 2 | 0.78 | 72.2 | 330 | 1.155 |
| Comparative Example 3 | 0.65 | 89.1 | 1500 | 1.235 |
| Comparative Example 4 | 0.81 | 83.7 | 1420 | 1.205 |
| Comparative Example 5 | 0.89 | 87.5 | 1450 | 1.235 |

What is claimed is:

1. A permanent magnet expressed by a composition formula:

$R_p Fe_q M_r Cu_t Co_{100-p-q-r-t}$ where R represents at least one element selected from the group consisting of rare earth elements, M represents at least one element selected from the group consisting of Zr, Ti, and Hf, p represents a number satisfying $10.5 \leq p \leq 12.0$ atomic percent, q represents a number satisfying $26 \leq q \leq 40$ atomic percent, r represents a number satisfying $0.88 \leq r \leq 2.24$ atomic percent, and t represents a number satisfying $3.5 \leq t \leq 13.5$ atomic percent, the magnet comprising:

a metal structure including a main phase having a $Th_2Zn_{17}$ crystal phase and a grain boundary phase provided between crystal grains of the main phase, wherein the main phase includes a cell phase having the $Th_2Zn_{17}$ crystal phase and a Cu-rich phase, the Cu-rich phase is provided to divide the cell phase and has a Cu concentration higher than the cell phase, and wherein a section including a c-axis of the $Th_2Zn_{17}$ crystal phase has a first region in the crystal grain and a second region in the crystal grain, the first region is provided in the cell phase divided by the Cu-rich phase, the second region is provided between the first region and the grain boundary phase in a direction perpendicular to the grain boundary phase and within a range of not less than 50 nm nor more than 200 nm from the grain boundary phase in the direction, the Cu-rich phase is provided between the first and second regions in the direction, the first region is farther from the grain boundary phase in the direction than the second region is, the first region is farther from the second region in the direction than the grain boundary phase is, the first region is provided more than 200 nm away from the second region in the direction, and a difference between a Cu concentration of the first region and a Cu concentration of the second region is 0.4 atomic percent or less.

2. The magnet according to claim 1, wherein the Cu concentration of the first region is 1.5 atomic percent or more and 5 atomic percent or less.

3. The magnet according to claim 1, wherein an Fe concentration of the first region is 26 atomic percent or more.

4. The magnet according to claim 1, wherein 50 atomic percent or more of the element R in the composition formula is Sm, and wherein 50 atomic percent or more of the element M in the composition formula is Zr.

5. A rotary electrical machine comprising the permanent magnet according to claim 1.

6. The rotary electrical machine according to claim 5, wherein the machine is a motor or a generator.

7. The rotary electrical machine according to claim 5, comprising:
a stator; and
a rotor,
wherein the stator or the rotor has the permanent magnet.

8. A vehicle comprising the rotary electrical machine according to claim 5.

9. The vehicle according to claim 8, wherein rotation is transmitted to a shaft provided in one end of the rotary electrical machine.

10. A permanent magnet expressed by a composition formula:

$R_p Fe_q M_r Cu_t (Co_{100-x} A_x)_{100-p-q-r-t}$ where R represents at least one element selected from the group consisting of rare earth elements, M represents at least one element selected from the group consisting of Zr, Ti, and Hf, A is at least one element selected from the group consisting of Ni, V, Cr, Mn, Al, Ga, Nb, Ta, and W, p represents a number satisfying $10.5 \leq q \leq 12.0$ atomic percent, q represents a number satisfying $26 \leq q \leq 40$ atomic percent, r represents a number satisfying $0.88 \leq r \leq 2.24$ atomic percent, and t represents a number satisfying $3.5 \leq t \leq 13.5$ atomic percent, and x is a number satisfying $x \leq 20$ atomic percent, the magnet comprising:

a metal structure including a main phase having a $Th_2Zn_{17}$ crystal phase and a grain boundary phase provided between crystal grains of the main phase, wherein the main phase includes a cell phase having the $Th_2Zn_{17}$ crystal phase and a Cu-rich phase, the Cu-rich phase is provided to divide the cell phase and has a Cu concentration higher than the cell phase, and wherein a section including a c-axis of the $Th_2Zn_{17}$ crystal phase has a first region in the crystal grain and a second region in the crystal grain, the first region is provided in the cell phase divided by the Cu-rich phase, the second region is provided between the first region and the grain boundary phase in a direction perpendicular to the grain boundary phase and within a range of not less than 50 nm nor more than 200 nm from the grain boundary phase in the direction, the Cu-rich phase is provided between the first and second regions in the direction, the first region is farther from the grain boundary phase in the direction than the second region phase is, the first region is farther from the second region in the direction than the grain boundary phase is, the first region is provided more than 200 nm away from the second region in the direction, and a difference between a Cu concentration of the first region and a Cu concentration of the second region is 0.4 atomic percent or less.

11. A permanent magnet expressed by a composition formula:

$R_p Fe_q M_r Cu_t Co_{100-p-q-r-t}$ where R represents at least one element selected from the group consisting of rare earth elements, M represents at least one element selected from the group consisting of Zr, Ti, and Hf, p represents a number satisfying $10.5 \leq p \leq 12.0$ atomic percent, q represents a number satisfying $26 \leq q \leq 40$ atomic percent, r represents a number satisfying $0.88 \leq r \leq 2.24$ atomic percent, and t represents a number satisfying $3.5 \leq t \leq 13.5$ atomic percent, the magnet comprising:

a metal structure including a main phase having a $Th_2Zn_{17}$ crystal phase and a grain boundary phase provided between crystal grains of the main phase, wherein the main phase includes a cell phase having the $Th_2Zn_{17}$ crystal phase and a Cu-rich phase, the Cu-rich phase is provided to divide the cell phase and has a Cu concentration higher than the cell phase, wherein a section including a c-axis of the $Th_2Zn_{17}$ crystal phase has a first region in the crystal grain and a second region in the crystal grain, the first region is provided in the cell phase divided by the Cu-rich phase, the second region is provided within a range of not less than 50 nm nor more than 200 nm from the grain boundary phase in a direction perpendicular to the grain boundary phase, and a difference between a Cu concentration of the first region and a Cu concentration of the second region is 0.4 atomic percent or less, and wherein the permanent magnet achieves a combination of a coercive force of 1720 kA/m or more, a residual magnetization of 1.235 T or less, and a squareness ratio of 93% or more.

12. The magnet according to claim 11, wherein the first region is farther from the grain boundary phase in the direction than the second region phase is, the first region is farther from the second region in the direction than the grain boundary phase is, the first region is provided more than 200 nm away from the grain boundary phase in the direction.

* * * * *